United States Patent
Almeida et al.

(10) Patent No.: US 12,136,832 B2
(45) Date of Patent: Nov. 5, 2024

(54) DEVICE WITH PLURAL WIRELESS CHARGERS CONNECTABLE TO EACH OTHER

(71) Applicant: Lenovo (Singapore) Pte. Ltd., Singapore (SG)

(72) Inventors: Rodrigo Almeida, Raleigh, NC (US); Alfredo Zugasti, Cary, NC (US); William Holroyd, Holly Springs, NC (US); Prabhat Alok Tyagi, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 489 days.

(21) Appl. No.: 17/515,362

(22) Filed: Oct. 29, 2021

(65) Prior Publication Data

US 2023/0136621 A1    May 4, 2023

(51) Int. Cl.
| | |
|---|---|
| *H01M 10/44* | (2006.01) |
| *H01M 10/46* | (2006.01) |
| *H02J 7/00* | (2006.01) |
| *H02J 50/10* | (2016.01) |
| *H02J 50/40* | (2016.01) |

(52) U.S. Cl.
CPC .......... *H02J 50/402* (2020.01); *H02J 7/0044* (2013.01); *H02J 50/10* (2016.02)

(58) Field of Classification Search
CPC ...... H02J 7/0042; H02J 7/0044; H02J 50/005; H02J 50/10; H02J 50/80; H02J 50/90; H02J 50/402

USPC ................. 320/103, 107, 108, 114, 115, 138
See application file for complete search history.

(56) References Cited

U.S. PATENT DOCUMENTS

| | | | |
|---|---|---|---|
| 8,667,452 B2 | 3/2014 | Verghese et al. | |
| 9,419,468 B1 | 8/2016 | Pierson | |
| 9,496,732 B2 | 11/2016 | Partovi | |
| 9,935,485 B2 | 4/2018 | Carlson et al. | |
| 2005/0068009 A1* | 3/2005 | Aoki | G05F 1/70 700/297 |
| 2005/0156560 A1* | 7/2005 | Shimaoka | H02J 7/0013 320/107 |
| 2011/0050164 A1 | 3/2011 | Partovi et al. | |
| 2013/0043734 A1 | 2/2013 | Stone et al. | |
| 2013/0285604 A1 | 10/2013 | Partovi | |

(Continued)

FOREIGN PATENT DOCUMENTS

| | | |
|---|---|---|
| CN | 103490482 A | 1/2014 |
| CN | 102118069 B | 12/2014 |

(Continued)

OTHER PUBLICATIONS

"Inductive Charging", Wikipedia, retrieved from https://en.wikipedia.org/wiki/Inductive_charging on Oct. 28, 2021.

(Continued)

*Primary Examiner* — Edward Tso
(74) *Attorney, Agent, or Firm* — John M. Rogitz; John L. Rogitz

(57) ABSTRACT

In one aspect, a first device includes a surface onto which objects are placeable and plural wireless chargers electrically connectable to each other. The plural wireless chargers are disposed beneath the surface so a second device can be charged while resting on the surface at various locations.

16 Claims, 8 Drawing Sheets

(56) References Cited

U.S. PATENT DOCUMENTS

| | | |
|---|---|---|
| 2015/0123604 A1 | 5/2015 | Lee et al. |
| 2016/0072299 A1 | 3/2016 | Huang et al. |
| 2016/0176299 A1 | 6/2016 | Kautz |
| 2019/0288545 A1 | 9/2019 | Konanur et al. |
| 2020/0044482 A1* | 2/2020 | Partovi ................. H02J 7/0047 |

FOREIGN PATENT DOCUMENTS

| | | | |
|---|---|---|---|
| CN | 103827998 B | 11/2017 | |
| KR | 20170033506 A * | 3/2017 | |
| WO | WO-2016164741 A1 * | 10/2016 | ............. G06F 1/263 |

OTHER PUBLICATIONS

Carlson et al., "Transitionable Magnetic Barrier for Wireless Charging Device", file history of related U.S. Appl. No. 14/820,958, filed Aug. 7, 2015.

Carlson et al., "Wireless Charging Device with Circuit Electrically Coupleable to First and Second Coils", file history of related U.S. Appl. No. 14/820,850, filed Aug. 7, 2015.

* cited by examiner

DEVICE WITH PLURAL WIRELESS CHARGERS CONNECTABLE TO EACH OTHER

FIELD

The disclosure below relates to technically inventive, non-routine solutions that are necessarily rooted in computer technology and that produce concrete technical improvements. In particular, the disclosure below relates to wireless chargers that are connectable to each other.

BACKGROUND

As recognized herein, wires used to charge devices can be inconvenient, malfunction, and take up valuable space that can be better utilized. As also recognized herein, a device should typically be placed directly over a single wireless charger at a designated location in order to wirelessly charge the device, but that can lead to situations where the device cannot be used while charging due to the inconvenient location of the wireless charger. Further still, users must still remember to place the device at the designated location, and failure to do so can result in the device not having enough battery power remaining when someone goes to use it later. Therefore, there are currently no adequate solutions to the foregoing computer-related, technological problems related to device charging.

SUMMARY

Accordingly, in one aspect a device includes a surface onto which objects are placeable as well as plural wireless chargers electrically connectable to each other. The plural wireless chargers are disposable beneath the surface.

In various example embodiments, each of the plural wireless chargers may include at least one charging coil as well as at least one male and/or female connector for connecting to another wireless charger.

In some examples, the plural wireless chargers may be arranged in grid array on the device and may be connectable to each other in series and in parallel. If desired, the plural wireless chargers may be accessible beneath the surface through a door or opening in the device.

Still further, in some example implementations the plural wireless chargers may include at least a first wireless charger for charging at a first power level and a second wireless charger for charging at a second power level greater than the first power level, where the first wireless charger may not be configured to charge at the second power level. The second wireless charger may be located more centrally on the device relative to an X-Y plane of the surface, and the first wireless charger may be located proximate to an edge of the surface relative to the X-Y plane of the surface.

Additionally, in some examples the device may include a first connector for connecting to an alternating current (AC) power source to power the plural wireless chargers as well as a second connector for connecting to a battery to power the plural wireless chargers. The device might even include the battery as well as at least one processor and storage accessible to the at least one processor. The storage may include instructions executable by the at least one processor to determine that power from the AC power source is not available and, responsive to the determination, control the device to transfer power from the battery through the second connector to the plural wireless chargers.

Also in some example embodiments, the device may be a first device and the first device may include at least one processor and storage accessible to the at least one processor. The storage may include instructions executable by the at least one processor to determine that power from an alternating current (AC) power source is not available and, responsive to the determination, use a first wireless charger of the plural wireless chargers to receive power wirelessly from a second device different from the first device. The instructions may then be executable to transfer the power received from the second device at the first wireless charger to a second wireless charger of the plural wireless chargers to then use the second wireless charger to charge a third device different from the first and second devices using the transferred power.

In another aspect, a method includes configuring a first wireless charger with a first connector for connecting to other wireless chargers for the wireless chargers to exchange power and configuring the first wireless charger with a second connector for connecting to other wireless chargers for the wireless chargers to exchange power. The second connector is different from the first connector.

In some examples, the first and second connectors may include wires and/or male plugs protruding from a housing of the first wireless charger. Additionally, or alternatively, the first and second connectors may include female ports extending into a housing of the first wireless charger.

In still another aspect, a first wireless charging device includes a wireless charger and plural connectors for connecting to other wireless charging devices different from the first wireless charging device. The connectors provide electrical paths for power to transfer between the first wireless charging device and the other wireless charging devices.

Thus, in some examples the wireless charger may include a coil and at least one circuit, with the coil including at least one wire disposed around a magnet. The plural connectors may be connected to the circuit, and the plural connectors may each include a wire protruding from a housing of the first wireless charging device, a male plug protruding from the housing, and/or a female port extending into the housing.

Still further, in some example embodiments the first wireless charging device may include at least one processor and storage accessible to the at least one processor. The storage may include instructions executable by the at least one processor to determine that power from an alternating current (AC) power source is not available and, responsive to the determination, control the first wireless charging device to receive power through one or more of the plural connectors from a direct current (DC) power source.

Additionally, or alternatively, the first wireless charging device may include at least one processor and storage accessible to the at least one processor, where the storage includes instructions executable by the at least one processor to determine that power from an alternating current (AC) power source is not available. Responsive to the determination, the instructions may be executable to use the wireless charger to wirelessly receive power from a second wireless charging device different from the first wireless charging device. The instructions may then be executable to transfer the power wirelessly received via the wireless charger to a third wireless charging device different from the first and second wireless charging devices.

Still further, in some examples the first wireless charging device may include furniture having a surface onto which a computing device is placeable for wireless charging via the wireless charger.

The details of present principles, both as to their structure and operation, can best be understood in reference to the accompanying drawings, in which like reference numerals refer to like parts, and in which:

DETAILED DESCRIPTION

Figure 1:
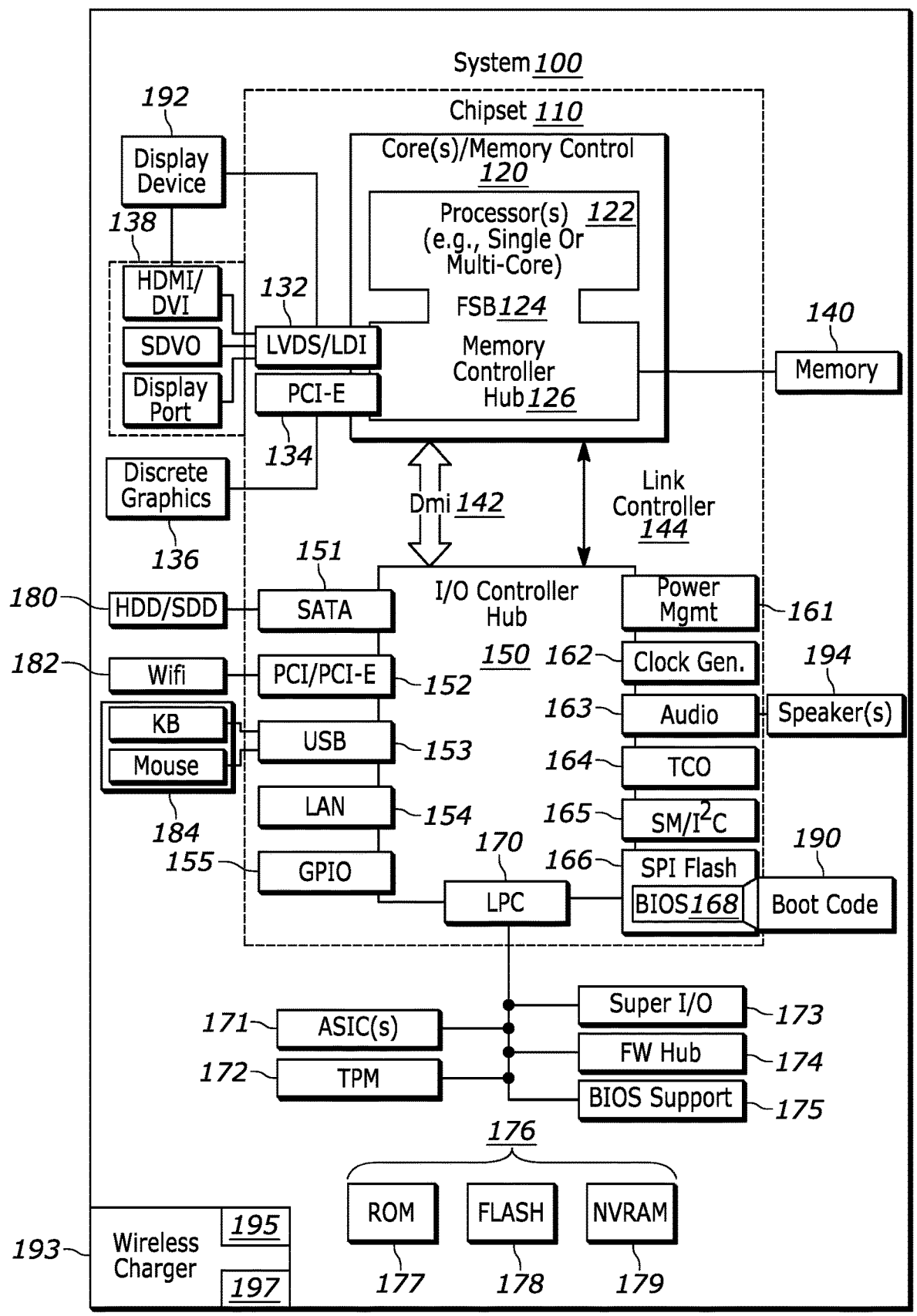
FIG. 1 is a block diagram of an example system consistent with present principles.

Among other things, the detailed description below describes wireless charging units/wireless chargers that are pluggable with each other as well as replaceable. They may therefore be connected as a mesh with other wireless charging units to create a charging surface of any shape and size a user desires, either as part of a piece of furniture or as a stand-alone mesh of wireless charging devices. The units may be connected in series and/or parallel, allowing continued charging even when one or more of the units fail.

In some examples, the mesh of charging units may be covered with a thin layer of material (e.g., forming part of a piece of furniture) to provide a seamless user experience and seamless look and feel while still providing charging capability and allowing for concurrent device usage by the user while charging occurs.

In various example implementations, the units may be low power wireless chargers for wirelessly charging devices like microphones, mouses, keyboards, and phones. Additionally, or alternatively, the units may be higher power wireless chargers to charge laptops, displays, etc.

Still further, if desired a battery backup may also be used to allow charging even during power outages. So, for example, in a situation where there is no AC power, a laptop can be connected to share power with other devices instead of the laptop just consuming power itself. That way a laptop may charge other devices that do not have an auxiliary power supply so they can continue working even if in the scenario of an AC outage. The switch of the laptop or other device to becoming a wireless charge provider device instead of a wireless charge consumer device may be done autonomously whenever the laptop, another device, or one of the wireless chargers themselves recognizes that there is no AC power anymore coming from the main supplier.

Also note that if desired, one or more units in the mesh may not actually have wireless charging components but may be blanks (e.g., with a hollow housing) to provide an area for cable pass-through and other implementations. But note that owing to other units of the mesh, with wireless chargers, being connected in series and/or in parallel, power may still pass around the blanks and between other wireless chargers for wireless charging at other areas of the mesh.

The connectors themselves that connect the various wireless chargers may be connectors for −/+ power polarity or may be custom connectors for −/+ power polarity and pin/channel used for synchronizing the wireless frequency between wireless chargers as described further below.

The connectors may be two pin (+/−), three pin (+/−/ground), three pin (+/−/sync), four pin (+/−/ground/sync), and/or any combination of those in one or more connectors.

Additionally, note that if someone puts a hole in a desk to run cables through (e.g., owner modified) and thus puts a hole in one of the wireless chargers, a short circuit for safety may be used. Grounding circuitry may thus be included. E.g., circuitry in each wireless charger may include a failsafe mechanism shorting to ground in the event of a wireless charger failure. Failure types might include the charger being injured through physical puncture or intrusion, or general failure over time.

Another type of failure may include the charger power passthrough connectors on the edge being short circuited, and so only that one edge of the charger might get disabled from providing passthrough power based on configuration of that charger's circuitry. Thus, consistent with present principles, if one edge of a hexagonal prism wireless charger is shorted, then the other five connectors may still work.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM, or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java/JavaScript, C # or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include at least one wireless charger 193 acting as a transmitter/receiver for transmitting and receiving a wireless charge via a magnetic field using, e.g., inductive wireless charging principles and/or resonant inductive coupling principles. Thus, the transceiver 193 may include a coil 195. The coil 195 may include at least one wire disposed around a magnet and may receive power from another wireless charger (transmitter) on another device/system via the magnetic/electromagnetic field created by the other charger when activated. Likewise, the coil 195 may itself act as a transmitter to transmit power from a battery pack on the system 100, and/or alternating current (AC) power source connected to the system 100, to other wireless chargers on other devices.

With the foregoing in mind, note that the transceiver 193 may also include at least one circuit 197 configured for receiving current from the coil 195 as received via wireless charging to then provide the current to the system 100 to power it as well as to provide the current to a battery/battery pack of the system 100 to charge the battery/pack. The circuit 197 may also provide power from the battery/pack or AC power source to the coil 195 for the coil 195 to wirelessly charge another device. Thus, the circuit 197 may include one or more converter(s), rectifier(s), regulator(s), inductor(s), capacitor(s), etc. and act as an Rx and/or Tx depending on implementation, switch configuration, and/or logic as set forth below.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
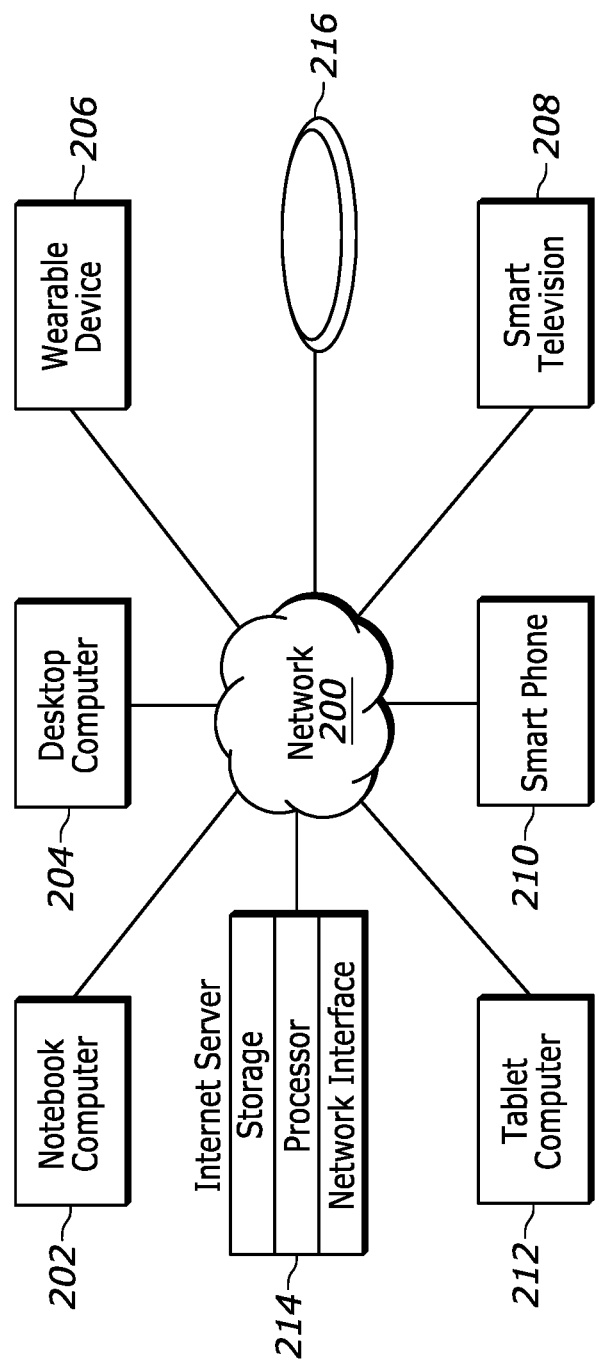
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a wireless charging device/wireless charger 216, and a server 214 such as an Internet server that may provide cloud storage accessible to the devices 202-212, 216. It is to be understood that the devices 202-216 may be configured to communicate with each other over the network 200 to undertake present principles.

Figure 3:
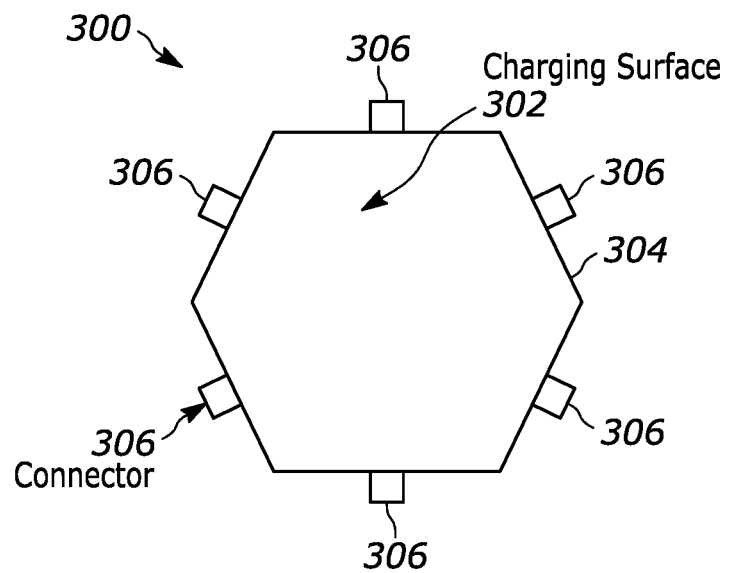
FIGS. 3, 4, 10, and 11 show top plan views of example wireless chargers consistent with present principles.

Referring now to FIG. 3, it shows a top plan view of an example wireless charging device/wireless charger 300 consistent with present principles. The charger 300 may incorporate one or more of the features of the wireless charger 193 described above, including a coil and circuit for wireless charging. As also shown in FIG. 3, the charger 300 may include a charging surface 302 onto which another device (such as a smartphone or tablet) may be placed for wireless charging of the other device, with the surface 302 establishing part of a housing 304 of the charger 300.

Additionally, the housing 304 of the charger 300 as shown in the example of FIG. 3 may be a hexagonal prism, with an X-Y dimension on top and bottom faces as shown in the top plan view of FIG. 3 being hexagons. However, note that other 3D shapes and profiles may also be used for the housing 304 depending on desired implementation, such as cube and boxed-shaped housings, cylindrical-shaped housings, and triangular prism housings etc.

As also shown in FIG. 3, extending from one or more edges of the top and bottom faces of the charger 300, and/or extending from sidewalls of the charger 300, may be one or more connectors 306 providing electrical paths for connecting the charger 300 to other wireless chargers consistent with present principles. The connectors 306 may be male connectors as shown (e.g., that may have just a wire, just a plug, or both a wire and a plug at the distal end). The connectors 306 may use universal serial bus (USB) communication and hardware standards (e.g., USB cables), though other types of communication protocols and hardware configurations may also be used. For example, the connectors 306 may not be male (or female) per se but may be universal connectors in that any connector 306 may connect to any other connector of similar or same type on another wireless charger (e.g., rather than having a male connector plug into a reciprocal female connector/port on another charger). In any event, as indicated above the connectors 306 may extend from a portion of the top charging surface 302, or from a sidewall of the hexagonal prism-shaped housing 304 along the Z dimension, so that, in either case, a respective connector 306 extends from each side of the housing 304 to connect to another respective wireless charger on each side of the charger 300 as described further below.

Figure 4:
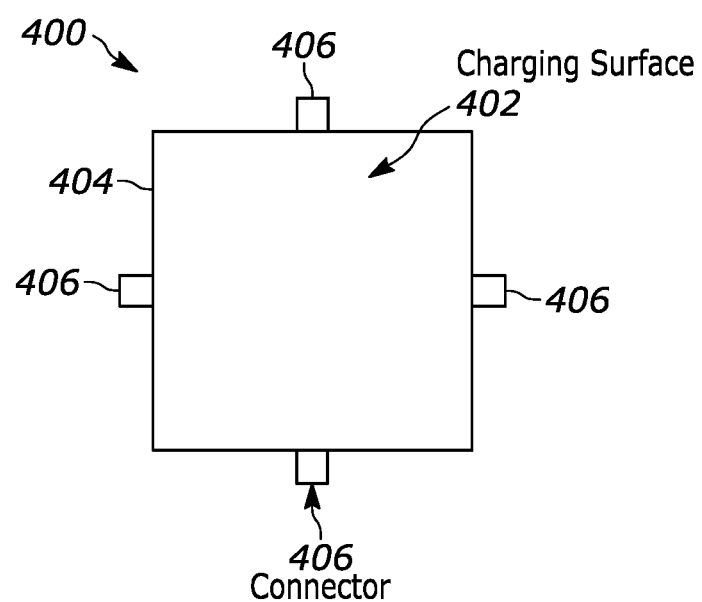

FIG. 4 shows another example of a wireless charging device/wireless charger 400 that may be used consistent with present principles. The charger 400 may be similar in many respects to the charger 300 as already described above, save for the housing 404 being box-shaped rather than hexagonal prism-shaped. Thus, the charger 400 may have a charging surface 402 on top as shown according to the top plan view of FIG. 4, as well as one or more connectors 406 that may be similar to the connectors 306 and that may extend from each side of the housing 404 similar to as described above in reference to FIG. 3.

Figure 5:
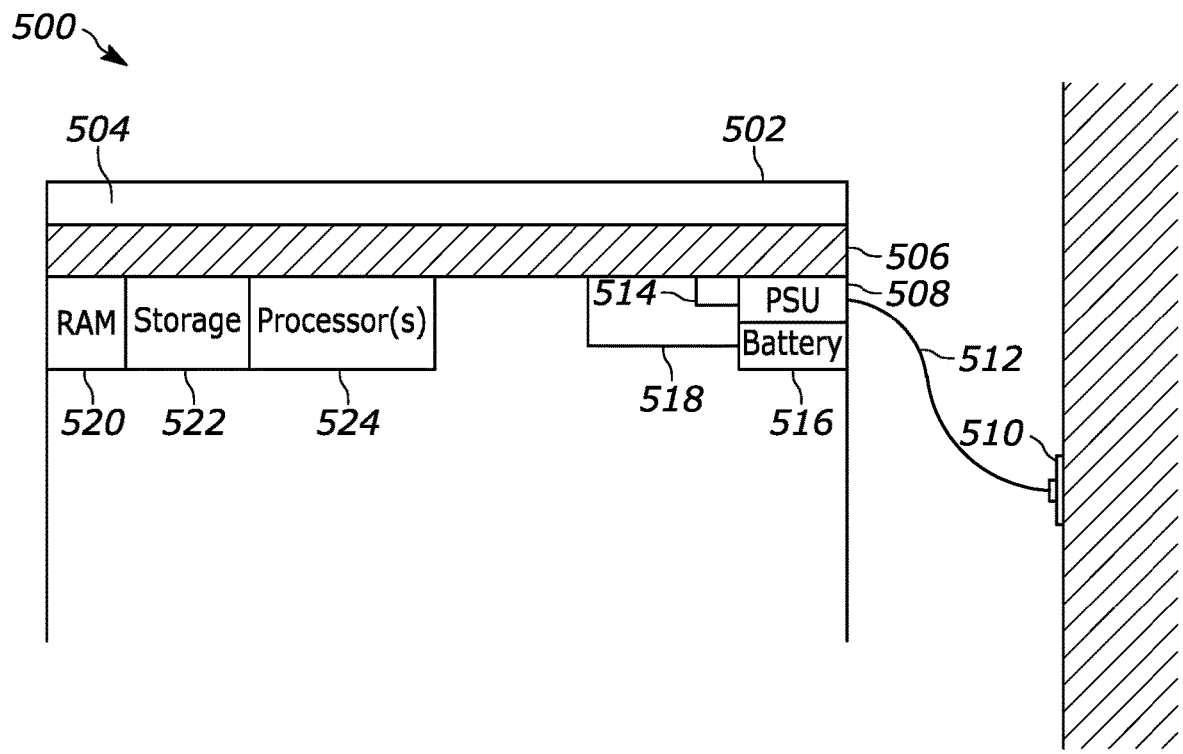
FIG. 5 shows a side elevational view of an example device housing plural wireless chargers and including a piece of furniture such as a desk or table consistent with present principles.

FIG. 5 shows a side elevational view of a device 500 that may include a piece of furniture 502 such as a desk or table as shown. However, the furniture included as part of the device 500 may be another type as well, such as a kitchen counter, bathroom counter, lab counter, dresser, chest, hutch, etc.

As shown in FIG. 5, the furniture 502 may have a surface 504 onto which objects are placeable for wireless charging and other purposes. Thus, beneath the surface 504 in a hollow chamber 506 may be plural wireless chargers (such as the chargers 300, 400 described above) that are electrically connected to each other in series and/or in parallel in order to transfer power from a power source between them for any one or more of the chargers to wirelessly charge another device. Thus, when a computing device such as a laptop computer, smartphone, or tablet is placed on the surface 504, one or more of the wireless chargers in the chamber 506 may charge the battery of the computing device as resting/placed on the surface 504. Accordingly, it is to be understood that the surface 504 may be made of a material that does not block wireless charging, such as a composite, laminate, wood/plywood, plastic, or polymer like ethylene-vinyl acetate (EVA).

As for the power source itself, it may include a power supply unit (PSU) 508 and/or alternating current (AC) power source 510 such as a wall outlet connected to a public electrical grid. The PSU 508 may convert AC power from the wall outlet as received via a connector/power cord 512 to direct current (DC) power to supply the DC power to the wireless chargers in the chamber 506 to power them for wireless charging. Accordingly, in addition to the connector 512 from the wall outlet 510 to the PSU 508, the device 500 may include another connector 514 from the PSU 508 to circuitry of the chamber 506, with the circuitry of the camber 506 connecting to one or more of the wireless chargers via one or more connectors of the wireless chargers themselves (e.g., connectors 306, 406) so that power may ultimately be routed from the outlet 510 to any/all connected wireless chargers within the chamber 506. Similarly, another power source 516 that may be a DC power source like a battery or battery pack may also be used to power the wireless chargers in the chamber 506 via a connector 518 between the DC source 516 and circuitry of the chamber 506. For example, the DC power source 516 may be a wiredly-connected laptop battery or even a dedicated battery incorporated into the device 500 as shown in FIG. 5 itself. The connectors 512, 514, 518 themselves may be established by power lines, wires, cables, etc.

For completeness, note that the device 500 of FIG. 5 may include one or more additional components, including any of those described above with respect to the system 100 of FIG. 1. For example, the device 500 may include its own RAM 520, non-transitory persistent storage 522 (such as hard disk drive, solid state drive, persistent flash memory, etc.), and one or more processors 524 (such as a central processing unit (CPU), graphics processing unit (GPU), microprocessor, FPGA, ASIC, etc.). Thus, software code stored in the storage 522 may be loaded into the RAM 520 for execution by the processor 524, including software code for executing the logic of FIG. 9 as will be described later.

Figure 6:
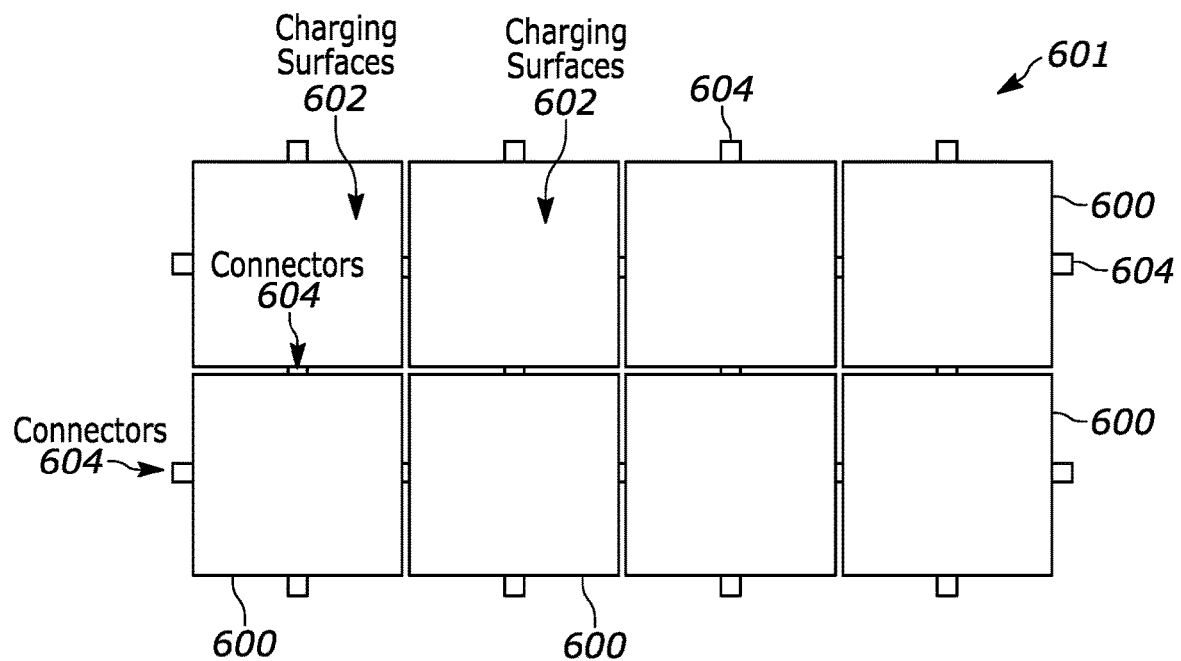
FIGS. 6, 7, 13, and 14 show example grid arrays of wireless chargers consistent with present principles.

However, reference is first made to FIG. 6, which shows a top plan view of a grid array 601 of plural box-shaped wireless charging devices/wireless chargers 600 that may each be established by the wireless charger 400 of FIG. 4. The grid array 601 may be arranged in the chamber 506 of FIG. 5, for example.

As shown, each charger 600 may include a respective charging surface 602 as well as respective connectors 604 extending from each side/sidewall. In certain examples, each connector 604 may be flippable in an interference fit between a retracted configuration in which the connector 604 sits in a bay of the wireless charger's housing (and flush with surrounding portions of the housing) and an extended configuration for connecting to a respective connector of another wireless charger on that respective side of the housing.

As also shown in FIG. 6, connectors 604 for respectively adjacent chargers 600 have been connected to each other to establish the grid array 601 so that power may be transferred from a power source between and among any/all of the chargers 600. Note that while two rows and four columns of electrically interconnected chargers 600 are shown, more or less rows and columns may be used. But it is to nonetheless be understood that in various examples, a grid array consistent with present principles may result in at least some of the wireless chargers 600 being electrically connected both in series and in parallel to exchange power.

Thus, the grid array 601 of FIG. 6 may be established by an end-user or manufacturer accessing the chamber 506 of the device 500 and connecting (or replacing) adjacent wireless chargers 600 to each other via their respective connectors 604 (e.g., once flipped into their extended configurations). Once the grid array 601 is established and the surface 504 again covers the chamber 506, a computing device such as a laptop or smartphone may then be placed on any portion of the surface 504 above one or more of the chargers 600 for its own battery to be charged by one or more of the chargers 600 through the surface 504.

Accordingly, it may be appreciated that there need not be a designated, relatively small spot on a corner of the surface 504 onto which the end-user must place the computing device to charge it wirelessly. Instead, the user may place the computing device at a variety of locations on the surface 504 for wireless charging since various locations of the surface 504 are each above a respective wireless charger 600 of the grid array 601. This might be particularly useful where the user wishes to still use the computing device while it charges.

What's more, since the chargers 600 may be connected in series and in parallel, even if one of the chargers 600 fails or malfunctions, power for wireless charging may still reach a respective charger 600 beneath the computing device itself via another electrical path. Thus, even if one of the chargers 600 fails or malfunctions, a user drills a hole through the surface 504 and through one of the chargers 600 of the array 601, or another situation occurs resulting in one of the chargers 600 becoming inoperable, the end-user may still be afforded wide latitude in options/locations for charging their computing device since power can be transferred through other chargers 600 of the array 601 that are still operational.

Figure 7:
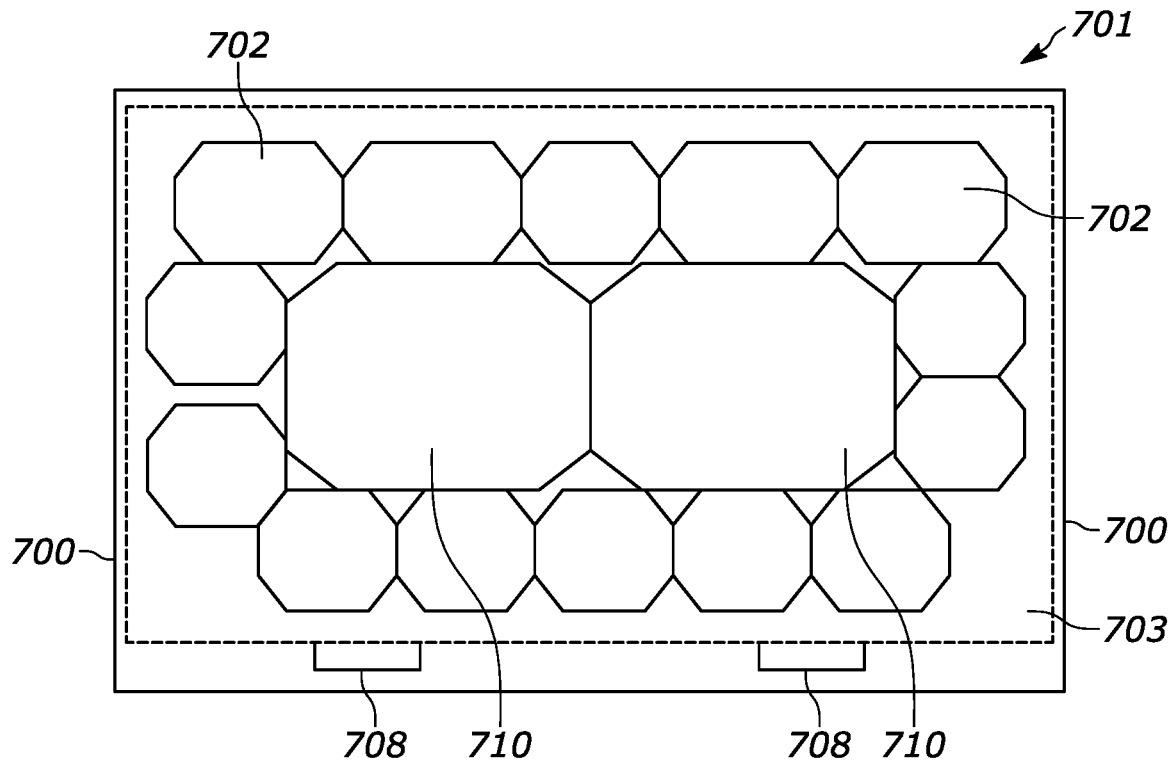

FIG. 7 shows another example grid array 701 including plural wireless charging devices/wireless chargers 700 that may be similar to the hexagonal prism-shaped chargers 300 of FIG. 3. However, rather than showing a grid array in isolation for clarity as in FIG. 6, here the grid array 701 is shown as disposed within a chamber 703 that may be similar to the chamber 506 of FIG. 5. Additionally, note that perforated lines 706 indicate the bounds of a door forming part of an upper surface such as the surface 504, with the door being connected to other portions of the furniture/device via one or more hinges 708 for opening and closing the door to access the chamber 703. Thus, the user may lift up the door itself to access the chamber 703 to establish the grid array 701, add wireless chargers to the array 701, and/or replace wireless chargers in the array 701.

Also, for completeness again note that each charger 700 may have a charging surface 702 onto which computing devices may be directly placed for charging, though the computing devices may also be placed onto another surface above the surface 702 such as the surface 504 of FIG. 5 consistent with present principles. In any case, each charger 700 may also include respective connectors (not shown) as described above in reference to FIG. 3 to establish the grid array 701 of interconnected chargers 700 arranged in series and in parallel. The connectors of FIG. 7 may also be flippable as described above in reference to FIG. 6.

Still in reference to FIG. 7, note that in some examples the wireless chargers 700 need not all be the same size or have the same charging capacity. For example, smaller wireless chargers 700 around the periphery of the array 701 and/or proximate to edges of the array 701/surface 504 along the X-Y plane of the array 701/surface 504 may be configured for charging at a first power level (e.g., below 100 watts) for relatively low power charging, such as for stand-alone microphones, Bluetooth speakers, or even smartphones. But as also shown in FIG. 7, one or more of the chargers 700 that are located more centrally on the array 701/surface 504 relative to the X-Y plane may have larger charging surfaces 702 as shown (designated as surfaces 710). These larger chargers may be configured for charging at a second power level that is greater than the first power level (e.g., above 100 watts) and that the smaller chargers are not configured to charge at. The second power level may be more appropriate for fast or even regular charging of a larger battery that might be included in a laptop computer or other relatively larger device, for example.

Accordingly, by arranging the larger chargers 700 capable of charging at the second power level more centrally in the array 701, a laptop that might be placed above one of those central locations for use by an end-user may still be charged at a sufficient rate while it is being used, all while a smartphone or other smaller device might concurrently rest on the surface 504 but more to the side and still receive an appropriate charge itself. However, further note that additional wireless chargers configured for charging at additional power levels beyond the first and second levels may also be used in any appropriate combination.

Furthermore, note in relation to the grid arrays of FIGS. 6 and 7 (and any other grid arrays that a user might establish using wireless chargers as described herein) that the wireless chargers may be synchronized with each other so that their respective wireless charging fields are in phase with each other/oscillate in unison at the same time. This may be done so that even if a computing device that is to be charged does not have its own wireless charging coil placed directly over one of the wireless chargers in the furniture itself, fields from the coils of off-center wireless chargers may still be used to charge the computing device without any sort of destructive interference or other issues arising from the fields of the different wireless chargers being out of phase.

Accordingly, it is to be further understood that in some examples the connectors between the wireless chargers themselves may be used not just to exchange power but to also exchange data. The exchanged data may include timing data to sync the wireless chargers for the field of each wireless charger to be in phase with the fields of the other wireless chargers. The syncing, and hence exchange of timing information, may occur at all times that an AC or DC power source is available, or may occur responsive to one of the wireless chargers detecting a draw resulting from a computing device receiving a wireless charge off of it. A processor such as the processor 524 may act as coordinator to establish the timing information, or the wireless charger that first detected the draw may be elected for its timing information to be copied by other wireless chargers.

Figure 8:
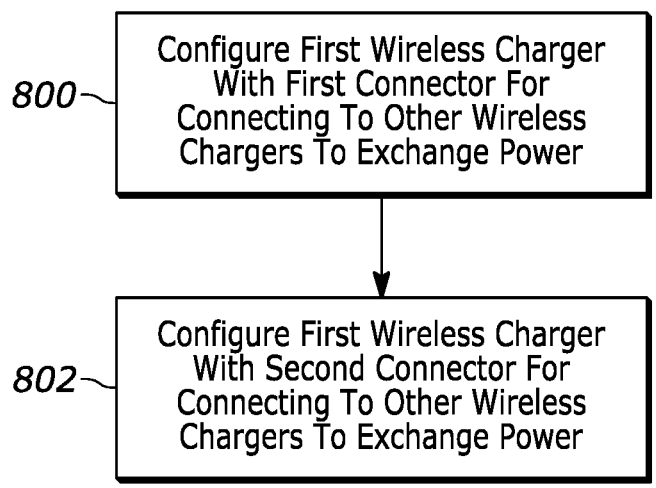
FIG. 8 shows a flow chart of steps that may be used for wireless charger configuration consistent with present principles.

Now describing FIG. 8, it shows an example flow chart of steps that may be taken to configure a wireless charging device/wireless charger consistent with present principles, e.g., during manufacture or by an end-user during home assembly. Beginning at block 800, a first wireless charger may be configured with a first connector for connecting to other wireless chargers for the wireless chargers to exchange power. This may include connecting electrical paths and circuits, installing a male or female connector, etc. The logic may then move to block 802 where the first wireless charger may be similarly configured with a second connector for connecting to other wireless chargers for the wireless chargers to exchange power.

Thus, the different first and second connectors may be subsequently connected to second and third wireless chargers via the respective first and second connectors to establish a grid array as described above. Again, note consistent with the disclosure above that the first and second connectors may include male wires and/or plugs protruding from a housing of the first wireless charger, and/or female ports extending into the housing.

Figure 9:
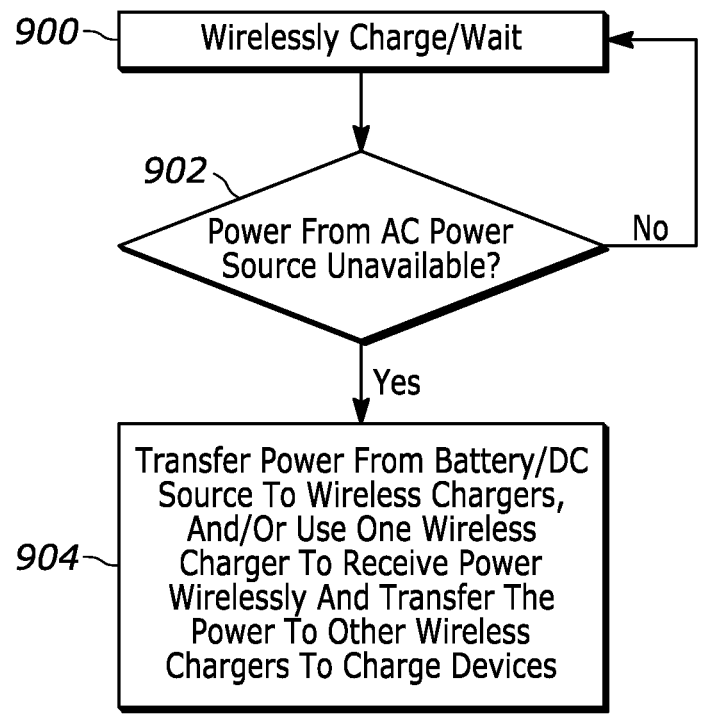
FIG. 9 shows example logic in example flow chart format that may be executed by a device consistent with present principles.

Continuing the detailed description in reference to FIG. 9, it shows example logic consistent with present principles that may be executed by a first device such as the system 100, device 500, or even one of the wireless charging devices/wireless charges themselves if elected or designated as coordinating device. Note that while the logic of FIG. 9 is shown in flow chart format, other suitable logic may also be used. Also note that the logic of FIG. 9 may be executed so that wireless charging may still be accomplished in the event of an AC power loss.

Accordingly, beginning at block 900 the first device may wait to or actually wirelessly charge a second device using power from an AC power source consistent with present principles. From block 900 the logic may then proceed to decision diamond 902 where the first device may determine whether power from the AC power source is currently unavailable. This might occur due to a power outage, an issue with the electrical system in the building in which the first device is disposed, the first device being unplugged from the AC power source, etc. The determination itself may be made based on the first device identifying, via its circuitry, a drop or loss in current being provided from the AC source.

A negative determination at diamond 902 may cause the logic to revert back to block 900 and proceed again from there. However, an affirmative determination may instead cause the logic to proceed to block 904, where one or more other actions may be taken by the first device.

For example, responsive to an affirmative determination at diamond 902, at block 904 the first device may control its circuitry (e.g., operate an electrical switch) to begin transferring or drawing power from an alternate DC power source such as the battery 516 from above to power wireless chargers on the first device to charge the second device.

As another example, responsive to an affirmative determination at diamond 902, at block 904 the first device may control its circuitry to switch one of the wireless chargers from provider mode to receiver mode to begin drawing power wirelessly from a third device such as a laptop computer resting on the first device's surface (e.g., surface 504). To draw the power, the first device may electronically notify the laptop to begin providing a wireless charge and then the first device may determine which wireless charger to place in receiver mode based on which wireless charger senses the laptop's wireless charging field the strongest. Power that is then wirelessly received from the laptop (via the wireless charger in receiver mode) may then be transferred through the circuitry of the first device (including other wireless chargers in series and/or parallel) to another one of the wireless chargers in the grid array in order to charge the second device via the other wireless charger and power drawn from the third device itself.

Figure 10:
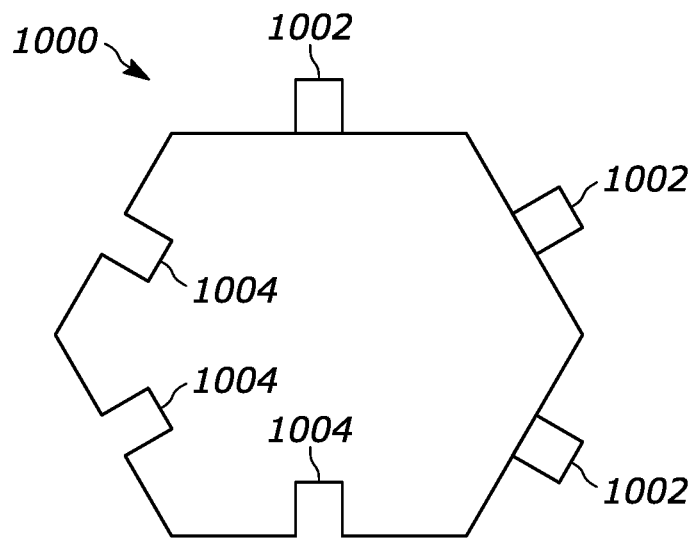

Now in reference to FIG. 10, another example embodiment of a generally hexagonal prism-shaped wireless charging device/wireless charger 1000 is shown, though the housing of the charger 1000 may also be another 3D shape as also described above. Further note that the charger 1000 may be similar to the charger 300 described above save for the following difference.

As shown in FIG. 10, three connectors 1002 are male connectors, but three other connectors 1004 are female connectors/ports for receiving a reciprocal male connector of another wireless charger (like one of the connectors 1002 shown). For example, the male and female connectors may be USB-based reciprocal connectors so that a male connector from one wireless charger may be plugged into a female connector of another wireless charger to establish an electrical path between the two consistent with present principles.

Figure 11:
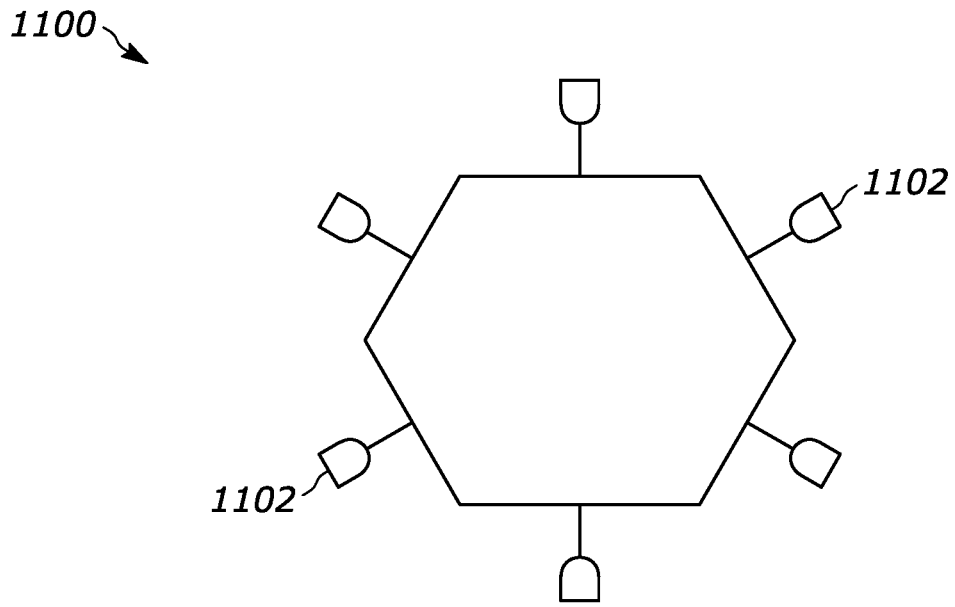

FIG. 11 shows yet another example of connectors that may be used for connecting wireless chargers with each other. Here again a hexagonal prism-shaped wireless charger 1100 is shown but note once more than a wireless charger of another shape might also be used. In any case, as shown in FIG. 11 the charger 1100 includes respective male connectors 1102 that each include a wire protruding from the housing of the wireless charger 1100 and a male plug at a distal end thereof to connect to another wireless charger via a reciprocal plug, female port, etc.

Figure 12:
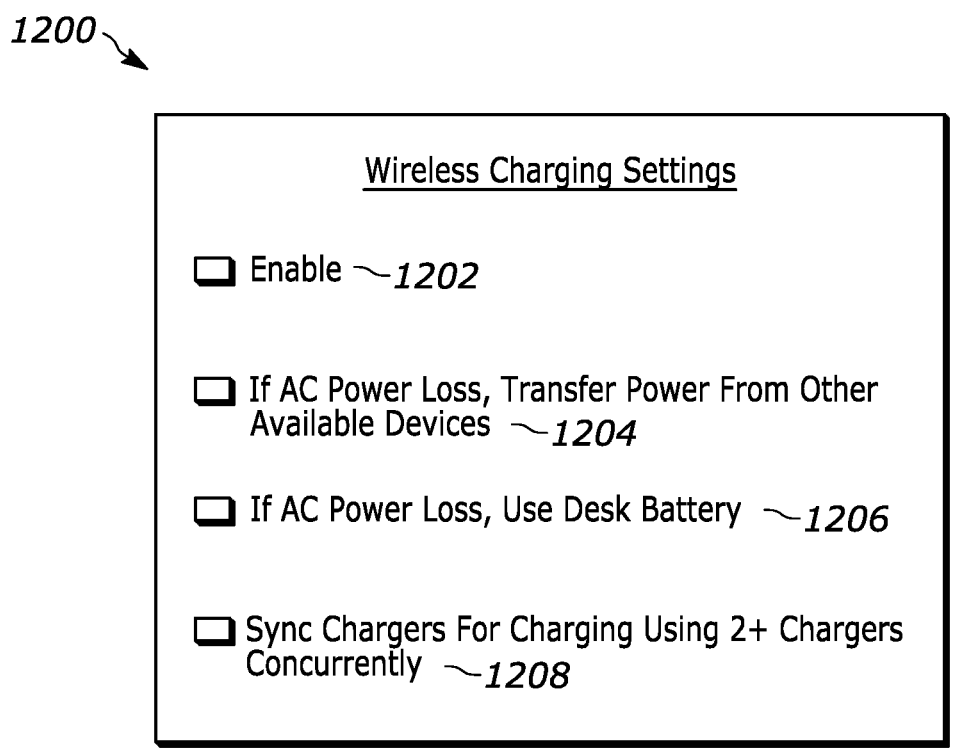
FIG. 12 shows an example graphical user interface (GUI) that may be presented on an electronic display for configuring one or more settings of a device to operate consistent with present principles.

Now in reference to FIG. 12, it shows an example graphical user interface (GUI) 1200 that may be presented on a display of a device such as the system 100, device 500, or another connected/paired device such as a user's smart phone. The GUI 1200 may be used to configure one or more settings of the device to operate consistent with present principles for wireless charging. Note that in the example shown, each option or sub-option may be selected by directing touch or cursor input to the corresponding check box adjacent to the respective option.

Accordingly, as shown the GUI 1200 may include a first option 1202 that may be selectable to set or configure the device to undertake present principles. For example, the option 1202 may be selected a single time to set or enable the device to use multiple wireless chargers operating in concert to wirelessly charge another device, to execute the logic of FIG. 9 in the future for multiple different charging instances, and/or to perform other functions described herein.

The GUI 1200 may also include a sub-option 1204 that may be selectable to specifically set or enable the device to use power received wirelessly from another device to charge yet another device as described above in reference to block 904 in the event of an AC power loss. Similarly, sub-option 1206 may be selectable to set or enable the device to use the device's own DC power supply (e.g., the battery 516) to wirelessly charge another device in the event of an AC power loss.

Also note that in some examples the GUI 1200 may include an option 1208. The option 1208 may be selected to set or enable the device to sync wireless charging among the various wireless chargers of its grid array to charge another device using two chargers that are concurrently providing power as described above in reference to FIGS. 6 and 7 (e.g., in instances where the other device's wireless charge receiver is not placed directly over one of the chargers but is still able to receive at least some wireless charge from plural different off-center wireless chargers in the array).

Figure 13:
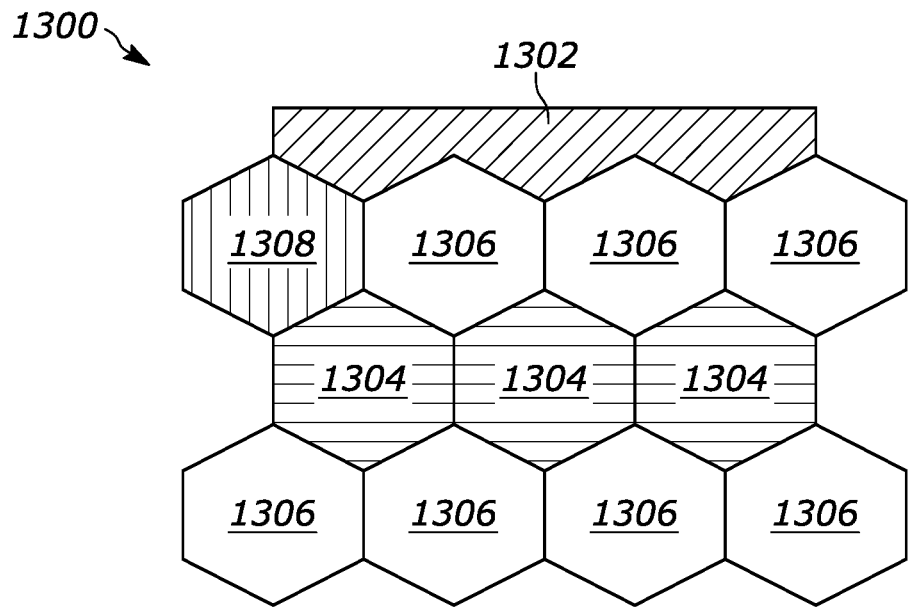

Turning now to FIG. 13, another example grid array 1300 of wireless chargers consistent with present principles is shown. As may be appreciated from FIG. 13, the array includes hexagonal prism-shaped wireless chargers as described above, all of the same size in this example. However, also according to this example the internals of the wireless chargers may still be different from each other based on how much power the respective wireless charger is to transmit. For example, one charger might be a 5 w charger, another may be a 10 w charger, and other may be a 15 w charger.

As also shown in FIG. 13, a power source adapter or "feeder bar" 1302 may be used as part of the array 1300 for connection to all the wireless chargers of the array 1300. The adapter 1302 may be connected to an external power source like an AC wall outlet and/or connected to a battery. Additionally, high output wireless chargers 1304 may form part of the array 1300 and may be positioned in the center of the surface/array where devices requiring more power are more likely to be sitting. The high output chargers 1304 may still be the same size as other chargers but with different internals allowing them to transmit higher power.

Figure 14:
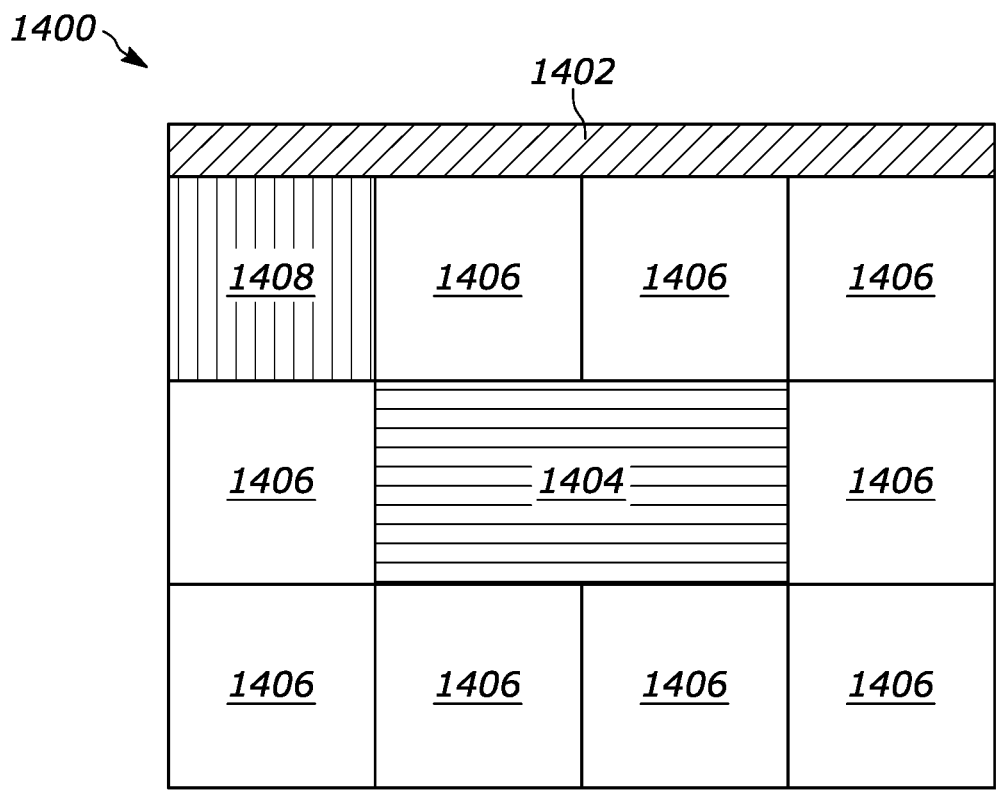

However, in other examples high output chargers such as the charger 1404 of FIG. 14 may be alternative sizes which are compatible with the smaller sizes of other chargers, as shown by the box-shaped wireless charger example grid array 1400 of FIG. 14 that also has its own power source adapter or "feeder bar" 1402. But regardless of size, each charger in some examples may house two or more of standard power transceivers.

Referring back to FIG. 13, note that chargers 1306 (or chargers 1406 per FIG. 14) may be standard or uniform powered versions of wireless chargers. This does not necessarily mean they are low powered since one array might include a whole desk surface using high power versions of the charger.

Housing/device 1308 as also shown in FIG. 13 (or housing/device 1408 per FIG. 14) may be a "filler" device used to provide the same structural integrity as the other chargers themselves from a weight-bearing perspective, but may not contain a charging transceiver itself. Thus, a desk manufacturer who wanted a cord passthrough in the surface could align the hole to be drilled in the center of the device 1308.

Moving on from FIGS. 13 and 14, note that example wireless chargers may be a transmitter and/or transceiver depending on implementation. Thus, in the example of a "reflective surface" grid array where the array of chargers may not be actively powered by a wired power source (wall or battery) and instead simply transfer power from one device to another nearby devices also sitting on the same surface (such as a laptop on a desk powering a smartphone near it as described above), the charger can both transmit and receive wireless power.

It may now be appreciated that present principles provide for an improved computer-based user interface that increases the functionality, wireless charge availability, and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. A device, comprising:
    a surface onto which objects are placeable;
    plural wireless chargers electrically connectable to each other, the plural wireless chargers being disposable beneath the surface;
    a first connector for connecting to an alternating current (AC) power source to power the plural wireless chargers; and
    a second connector for connecting to a battery to power the plural wireless chargers.

2. The device of claim 1, wherein each of the plural wireless chargers comprises:
    at least one charging coil; and
    at least one male and/or female electrical connector for connecting to another wireless charger.

3. The device of claim 1, wherein the plural wireless chargers are arranged in grid array on the device.

4. The device of claim 1, wherein at least some of the plural wireless chargers are connectable to each other in series and in parallel.

5. The device of claim 1, wherein the plural wireless chargers are accessible beneath the surface through a door or opening in the device.

6. The device of claim 1, wherein the plural wireless chargers comprise at least a first wireless charger for charging at a first power level and a second wireless charger for charging at a second power level greater than the first power level, the first wireless charger not configured to charge at the second power level.

7. The device of claim 6, wherein the second wireless charger is located more centrally on the device relative to an X-Y plane of the surface, and wherein the first wireless charger is located proximate to an edge of the surface relative to the X-Y plane of the surface.

8. The device of claim 1, comprising the battery.

9. The device of claim 1, comprising:
    at least one processor;
    storage accessible to the at least one processor and comprising instructions executable by the at least one processor to:
    determine that power from the AC power source is not available; and
    responsive to the determination, control the device to transfer power from the battery through the second connector to the plural wireless chargers.

10. The device of claim 1, wherein the device is a first device, and wherein the first device comprises:
    at least one processor;
    storage accessible to the at least one processor and comprising instructions executable by the at least one processor to:
    determine that power from the AC power source is not available;
    responsive to the determination, use a first wireless charger of the plural wireless chargers to receive power wirelessly from a second device different from the first device;
    transfer the power received from the second device at the first wireless charger to a second wireless charger of the plural wireless chargers; and
    use the second wireless charger to charge a third device different from the first and second devices using the transferred power.

11. A method, comprising:
    determining, using a first device, that power from an alternating current (AC) power source is not available;

responsive to the determination, using a first wireless charger of plural wireless chargers to receive power wirelessly from a second device different from the first device;

transferring the power received from the second device at the first wireless charger to a second wireless charger of the plural wireless chargers; and using the second wireless charger to charge a third device different from the first and second devices using the transferred power.

12. An apparatus, comprising:

a first wireless charging device comprising a wireless charger;

plural connectors for connecting to other wireless charging devices different from the first wireless charging device, the connectors providing electrical paths for power to transfer between the first wireless charging device and the other wireless charging devices;

at least one processor;

storage accessible to the at least one processor and comprising instructions executable by the at least one processor to:

determine that power from an alternating current (AC) power source is not available; and responsive to the determination, control the first wireless charging device to receive power through one or more of the plural connectors from a direct current (DC) power source.

13. The apparatus of claim 12 wherein the wireless charger comprises a coil and at least one circuit, the coil comprising at least one wire disposed around a magnet.

14. The apparatus of claim 13, wherein the plural connectors are connected to the circuit, and wherein the plural connectors each comprise one or more of: a wire protruding from a housing of the first wireless charging device, a male plug protruding from the housing, a female port extending into the housing.

15. The apparatus of claim 12, wherein the instructions are executable by the at least one processor to:

responsive to the determination, use the wireless charger to wirelessly receive power from a second wireless charging device different from the first wireless charging device; and transfer the power wirelessly received via the wireless charger to a third wireless charging device different from the first and second wireless charging devices.

16. The apparatus of claim 12, comprising furniture having a surface onto which a computing device is placeable for wireless charging via the wireless charger.

* * * * *